(12) United States Patent
Chin et al.

(10) Patent No.: US 8,509,841 B2
(45) Date of Patent: Aug. 13, 2013

(54) UPDATING THE USER EQUIPMENT (UE) ALLOWED CLOSED SUBSCRIBER GROUP LIST (ACL)

(75) Inventors: Chen Ho Chin, Deerlijk (BE); Takashi Suzuki, Chiba (JP); Richard Charles Burbidge, Hook (GB); Gordon Peter Young, Shipston-on-Stour (GB); Jeffrey William Wirtanen, Kanata (CA); Muhammad Khaledul Islam, Ottawa (CA); David Philip Hole, Southampton (GB)

(73) Assignee: Research In Motion Limited, Waterloo, Ontario (CA)

( * ) Notice: Subject to any disclaimer, the term of this patent is extended or adjusted under 35 U.S.C. 154(b) by 337 days.

(21) Appl. No.: 12/763,376

(22) Filed: Apr. 20, 2010

(65) Prior Publication Data

US 2010/0267405 A1    Oct. 21, 2010

Related U.S. Application Data

(60) Provisional application No. 61/171,035, filed on Apr. 20, 2009.

(51) Int. Cl.
*H04M 1/00* (2006.01)

(52) U.S. Cl.
USPC ............ 455/550.1; 455/500; 455/552.1; 455/432.1; 455/434; 455/445; 709/223; 709/224; 709/225; 709/226; 707/620; 707/621; 707/622; 707/623; 707/705

(58) Field of Classification Search
USPC ........... 455/500, 550.1, 552.1, 432.1, 434, 455/435.1–445; 709/223–226; 707/620–623, 707/705
See application file for complete search history.

(56) References Cited

U.S. PATENT DOCUMENTS

| | | | |
|---|---|---|---|
| 2002/0111180 A1* | 8/2002 | Hogan et al. | 455/518 |
| 2008/0267153 A1* | 10/2008 | Mukherjee et al. | 370/338 |
| 2009/0047968 A1* | 2/2009 | Gunnarsson et al. | 455/446 |
| 2009/0092080 A1 | 4/2009 | Balasubramanian et al. | |
| 2009/0093232 A1 | 4/2009 | Gupta et al. | |

FOREIGN PATENT DOCUMENTS

| | | | |
|---|---|---|---|
| JP | 2002541747 | A | 12/2002 |
| JP | 2010525752 | A | 7/2010 |
| JP | 2011501515 | A | 1/2011 |
| JP | 2011501917 | A | 1/2011 |
| WO | 0060895 | A1 | 10/2000 |
| WO | 2008134281 | A2 | 11/2008 |
| WO | 2009048805 | A1 | 4/2009 |
| WO | 2009048888 | A2 | 4/2009 |

OTHER PUBLICATIONS

PCT International Search Report; PCT Application No. PCT/CA2010/000598; Aug. 4, 2010; 4 pgs.
PCT Written Opinion of the International Searching Authority; PCT Application No. PCT/CA2010/000598; Aug. 4, 2010; 4 pgs.

(Continued)

*Primary Examiner* — Fayyaz Alam
(74) *Attorney, Agent, or Firm* — Conley Rose, P.C.; J. Robert Brown, Jr.

(57) ABSTRACT

A user equipment (UE) is provided. The UE comprises a processor configured to receive a broadcast control channel (BCCH) comprising a first indication that a restricted access to a closed subscriber group has been changed and to initiate a signaling procedure based on the first indication.

29 Claims, 5 Drawing Sheets

(56) References Cited

OTHER PUBLICATIONS

3GPP TS 24.008 v8.4.0; 3rd Generation Partnership Project; Technical Specification Group Core Network and Terminals; Mobile Radio Interface Layer 3 Specification; Core Network Protocols; Stage 3; Release 8; Dec. 2008; 571 pgs.

3GPP TS 24.301 v8.0.0; 3rd Generation Partnership Project; Technical Specification Group Core Network and Terminals; Non-Access-Stratum (NAS) Protocol for Evolved Packet System (EPS); Stage 3; Release 8; Dec. 2008; 221 pgs.

3GPP TS 25.304 v8.4.0; 3rd Generation Partnership Project; Technical Specification Group Radio Access Network; User Equipment (UE) Procedures in Idle Mode and Procedures for Cell Reselection in Connected Mode; Release 8; Dec. 2008; 46 pgs.

3GPP TS 25.331 v6.20.0; 3rd Generation Partnership Project; Technical Specification Group Radio Access Network; Radio Resource Control (RRC); Protocol Specification; Release 6; Dec. 2008; 1251 pgs.

3GPP TS 36.304 v8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pgs.

3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.

3GPP TS 22.011 v8.6.0; 3rd Generation Partnership Project; Technical Specification Group Services and System Aspects; Service Accessibility; Release 8; Dec. 2008; 26 pgs.

3GPP TS 23.060 v8.3.0; 3rd Generation Partnership Project; Technical Specification Group Services and System Aspects; General Packet Radio Service (GPRS); Service Description; Stage 2; Release 8; Dec. 2008; 271 pgs.

3GPP TS 23.401 v8.4.1; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2008; 219 pgs.

3GPP TS 23.246 v8.2.0; 3rd Generation Partnership Project; Technical Specification Group Services and System Aspects; Multimedia Broadcast/Multicast Service (MBMS); Architecture and Functional Description; Release 8; Jun. 2008; 57 pgs.

Qualcomm Europe; 3GPP TSG CT WG1 Meeting #57; Title: Discussion on Paging Optimization When a User Is Removed from a CSG; C1-090368; San Antonio, TX; Feb. 9-19, 2009; 2 pgs.

Kineto Wireless Inc., NEC; 3GPP TSG CT WG1 Meeting #57; Title: Issues with "Allowed CSG List" Management; C1-090503; San Antonio, TX; Feb. 9-19, 2009; 3 pgs.

Japanese Office Action; Application No. 2012-505010; Dec. 26, 2012; 5 pages.

Korean Office Action; Application No. 10-2011-7027432; May 27, 2013; 10 pages.

\* cited by examiner

UPDATING THE USER EQUIPMENT (UE) ALLOWED CLOSED SUBSCRIBER GROUP LIST (ACL)

CROSS-REFERENCE TO RELATED APPLICATIONS

The present application claims priority to U.S. provisional patent application No. 61/171,035 filed Apr. 20, 2009, by Chen Ho CHIN, et al, entitled "Updating the User Equipment (UE) Allowed Closed Subscriber Group List (ACL)" (35133-US-PRV-4214-16800), which is incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" may comprise a plurality of hardware and software.

An LTE system can include protocols such as a Radio Resource Control (RRC) protocol, which is responsible for the assignment, configuration, and release of radio resources between a UA and an access node or relay node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
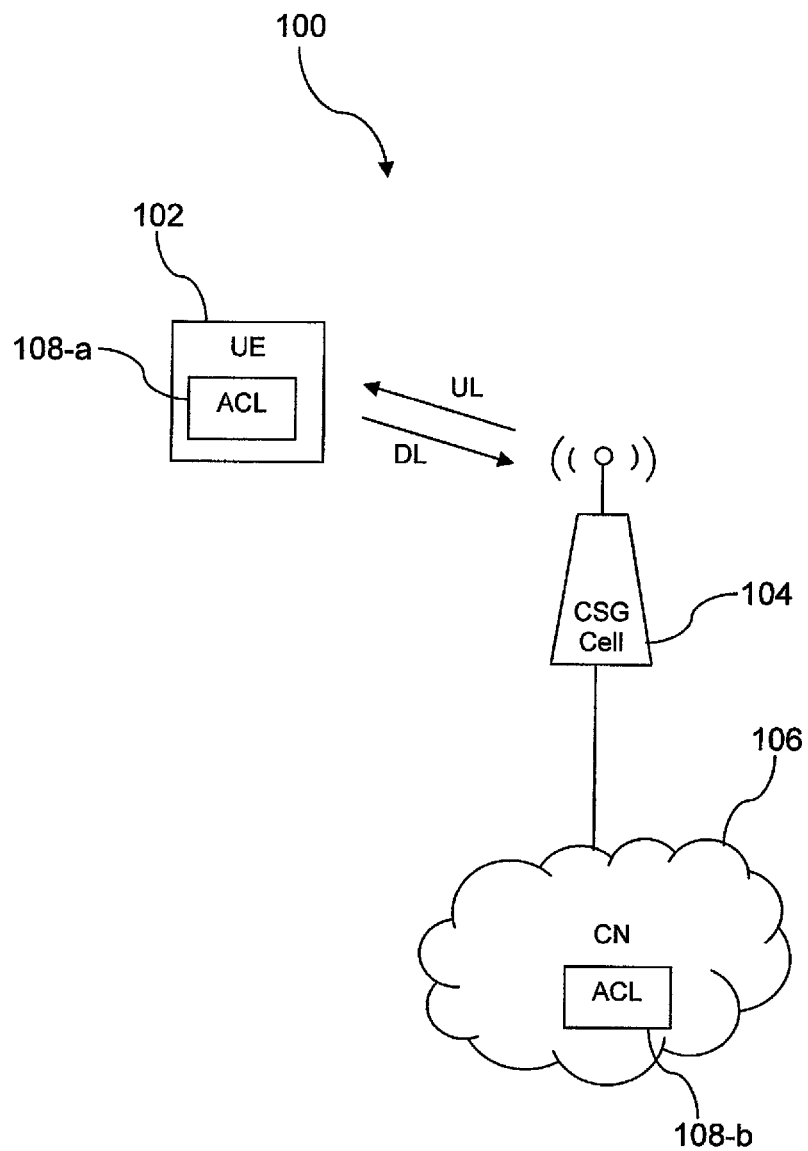
FIG. 1 is a block diagram of a mobile communications system according to some embodiments of the present disclosure.

Turning now to FIG. 1, a communication network 100 is described. In an embodiment, the network 100 may be a long-term evolution (LTE) wireless communication network, but in other embodiments the network 100 may comprise other wireless communication technologies, for example a Universal Terrestrial Radio Access Network (UTRAN). The network 100 comprises a user equipment (UE) 102 that may be in communication with a closed subscriber group (CSG) cell 104. The CSG cell 104 is communicatively coupled to a core network (CN) 106, to a packet data network (PDN), or to another network. It is understood that the coupling between the CSG cell 104 may comprise additional communication nodes (not shown) such as one or more serving gateways (SGWs), one or more PDN gateways (PGWs), one or more mobility management entities (MMEs), and/or one or more home subscriber servers (HSSs). Alternatively, the CN 106 may be considered to comprise such SGWs, PGWs, MMEs, and HSSs. The UE 102 may be a mobile phone, a personal digital assistant (PDA), or other mobile electronic communication device. The CSG cell 104 may be a home base station or femtocell. In some contexts, the CSG cell 104 may be referred to as an access node (AN). In some other contexts, the CSG cell 104 may be referred to as a hybrid cell consisting of some CSG functionality and other functionality such as open access.

Generally, to access communication services provided by a CSG cell, a UE must be granted restricted access to a CSG group associated with the CSG cell. This restricted access for a UE may be mediated, in an embodiment, through an allowed CSG list (ACL) that identifies CSG groups to which the UE is granted restricted access. A first ACL 108-*a* may be stored by the UE 102 and a second ACL 108-*b* may be stored within the CN 106. When the UE 102 seeks to select the CSG cell 104, for example while the UE 102 is in an RCC_IDLE mode, the UE 102 may first determine that the CSG identity broadcast by the CSG cell 104 is listed in the first ACL 108-*a*. When the UE 102 attempts to access the CN 106 through the CSG cell 104, the CN 106 does a check in its ACL 108-*b*, and if in ACL 108-*b* it is indicated that the CSG identity associated with the CSG cell 104 is associated with the UE 102 (e.g., UE 102 has been granted restricted access to the CSG group to which the CSG cell 104 is associated), then the CN 106 will route traffic bound for the UE 102 via the CSG cell 104.

In an embodiment, the ACL 108-*b* may identify all UEs 102 allowed restricted access to the CSG, while the ACL 108-*a* may identify all the CSGs to which the UE 102 is allowed restricted access. Synchronizing the ACL 108-*b* with the ACL 108-*a* may mean adding the CSG to the ACL 108-*a* when the ACL 108-*b* associated with the CSG has been changed to add the UE 102 and may mean deleting the CSG from the ACL 108-*a* when the ACL 108-*b* associated with the CSG has been changed to remove the UE 102.

The ACL 108 may change over time as the CSG groups to which the UE 102 is granted restricted access change. For example, the user associated with the UE 102 may accept employment with a company and be granted restricted access to a CSG group associated with a plurality of CSG cells located within the company campus, and the ACL 108 may be changed to add this CSG group for this UE 102. The UEs 102 associated with a plurality of employees of a first company that has been acquired by a second company may all be granted restricted access to a CSG group associated with the CSG cells belonging to the second company, such that the ACLs 108 associated with each of these UEs 102 would each be changed to add one or more CSG groups. Likewise, when an employee leaves the employment of a company, the ACL 108 may be changed to remove one or more of the CSG groups where restricted access was previously allowed, associated with the CSG cells as operated by the former employer. It is understood that changing the ACL 108 includes changing both the ACL 108-*a* on the UE 102 and changing the ACL 108-*b* in the CN 106. In some contexts, maintaining agreement between the ACL 108-*a* stored in the UE 102 and the ACL 108-*b* stored in the CN 106 may be referred to as synchronizing the ACL 108.

Problems may occur when the ACLs 108—for example the ACL 108-*a* on the UE 102 and the ACL 108-*b* in the CN 106—are out of synchronization, particularly when a CSG group is removed from the ACL 108-*b* in the CN 106 and the CSG group is not removed from the ACL 108-*a* on the UE 102. The present disclosure is directed, in part, at teaching new methods of reducing the probability of occurrence of the ACL out-of-synchronization problem. Several different approaches and methods are disclosed, each of which may have its own advantages and disadvantages in different operating environments or communications conditions. In some embodiments, a combination of methods may be employed to reduce the ACL out-of-synchronization problem. One approach involves broadcasting indications on the broadcast control channel (BCCH) to alert the UE 102, for example when the UE 102 is in RCC_IDLE mode. Another approach involves paging the UE 102 when the ACL 108-*b* changes and triggering the UE 102 to initiate a non access stratum (NAS) signaling procedure or an open mobile alliance (OMA) device management (DM) procedure, whereby the ACL 108 is synchronized.

If the ACL 108 initially indicates that the UE 102 is allowed restricted access to the CSG group to which the CSG cell 104 is associated, and then, while the UE 102 is in RCC_IDLE mode, the ACL 108-*b* changes to remove restricted access for the UE 102 to the CSG group, the ACL 108-*a* may not be updated for a while, and the UE 102 may assume that restricted access to the CSG group is still allowed. If the UE 102 is camped on the CSG cell 104 (e.g., the UE 102 is selected to the CSG cell 104), a user interface of the UE 102 may indicate "CSG service" or "CSG coverage," but the UE 102 may be unreachable from the CN 106. This is, for example, because the UE 102 is selected to the CSG cell 104, the UE 102 listens for paging messages only from the CSG cell 104; but because the modified ACL 108-*b* no longer grants restricted access to the UE 102 to the CSG group that the CSG cell 104 is associated with, the CN 106 does not indicate to the CSG cell 104 to page the UE 102. Additionally, in one alternative, if there is no macro-cell coverage at the location of the UE 102 (e.g., there are no eNBs providing unrestricted access coverage at the location of the UE 102), if the UE 102 attempts to originate a call, the attempt to originate through the CSG cell 104 will be rejected, the UE 102 will modify the ACL 108-*a* to remove the CSG group to which the CSG cell 104 is associated, and then the UE 102 will attempt to select to coverage from another cell but will only then discover that coverage is not available. Alternatively, the UE 102 may select to a macro cell, but the communication service may be provided at an undesirable fee and/or rate. In all these different scenarios, the user of the UE 102 may have a bad experience that reduces their satisfaction with their wireless communication service provider.

In an embodiment, the CSG cell 104 may broadcast an indication on the BCCH of the change of the ACL 108-*b* that the UE 102 may receive and use to trigger synchronization of the ACL 108-*a* with the ACL 108-*b* in the CN 106, for example based on the UE 102 initiating a non access stratum (NAS) signaling procedure, for example a tracking area update procedure and/or a service request procedure. Alternatively, the UE 102 may initiate a routing area update procedure, a location update procedure, and/or a service request procedure. Alternatively, the UE 102 may initiate an OMA DM procedure, and the UE 102 may be updated by an OMA-DM server (not shown). The CSG cell 104 may indicate a change in the ACL 108-*b* by changing the value tag carried in a master information block (MIB) of the BCCH or the value tag associated with a system information block. The value tag may be a sequence number, and incrementing the sequence number of the value tag may indicate a change after the assignment of the previous sequence number to the value tag. This sequence number may be employed by UEs 102 to determine if a new change in the system information provided by the BCCH has occurred or if they have previously decoded the indicated changed system information. The UE 102, upon determining that the incremented sequence number in the value tag indicates a change in system information, may read the remainder of the system information.

In an embodiment, the BCCH may be extended, according to the teachings of the present disclosure, to include an indication of an update of subscribers allowed restricted access to the CSG cell 104, for example including an indication of update of subscribers allowed restricted access to the CSG cell 104 in the MIB, in the first system information block (SIB1), or in other system information blocks that are part of the BCCH. In some contexts, the indication of update of subscribers allowed restricted access may be referred to as CSG_SUBS UPDATE. In one embodiment, the indication may be a flag; in another embodiment, the indication may be a sequence value that can be used by UEs 102 to discriminate between different updates. When a UE 102 reads the indication of update of subscribers allowed restricted access to the CSG cell 104 in the system information, the UE 102 may perform a NAS signaling procedure to synchronize the ACL 108-a stored by the UE 102 with the ACL 108-b in the CN 106. In some circumstances this simple synchronization procedure may provide the needed synchronization of the ACLs 108 at an acceptable signaling overhead. In other circumstances, for example when many UEs 102 are camped on the CSG cell 104, all of which will initiate the NAS signaling procedure, this simple procedure may suffer from excessive signaling overhead and multiple simultaneous accesses, as many UEs 102 initiate NAS signaling procedures substantially at the same time. In an embodiment, the procedure described above may be modified by the UEs 102 initiating NAS signaling procedures at different times, for example after a delay determined by each UE 102 based on generating different random numbers (for example, using a random number generating seed related to a unique identifier associated with the subject UE 102). In an alternative embodiment, the delay may be determined by each UE 102 based on hashing the unique identifier of the UE 102.

Depending upon the number of bits that may be allocated for transmitting the indication of update of subscribers allowed restricted access to the CSG cell, for example the CSG_SUBS_UPDATE parameter, the CSG cell 104 and/or the CN 106 may restrict the frequency of changing the sequence value provided in the CSG_SUBS_UPDATE. For example, if the CSG_SUBS_UPDATE is 8 bits, 256 different updates can be discriminated before the sequence value rolls over. If updating of the sequence number contained in the CSG_SUBS_UPDATE parameter is allowed once per minute, the sequence value rolls over about every 4 hours. The UE 102 may be configured to perform a NAS signaling procedure when it has not listened to the BCCH of the CSG cell 104 for more than 4 hours, since in this circumstance the UE 102 may have missed the roll-over of the CSG_SUBS_UPDATE parameter, for example when the UE 102 returns to the CSG cell 104 after being away for more than 4 hours. In combination with the present disclosure, those of ordinary skill in the art may adopt this example to form other rules when the CSG_SUBS_UPDATE parameter is composed of a different number of bits.

In another embodiment, the BCCH may be further extended to include a second indication to identify, at least partially, the UE 102 associated with the changed ACL 108-b. The second indication may be carried in the MIB, in the SIB1, or in other system information forming the BCCH. The second indication may identify the UE 102 by using the international mobile subscriber identity (IMSI) of the UE 102, the temporary mobile station identity (TMSI) of the UE 102, a M-TMSI of the UE 102, a P-TMSI of the UE 102, a S-TMSI of the UE 102, a GUTI of the UE 102, or any other identifier associated with the UE 102. It will be readily appreciated that a complete and unique identification of the UE 102 may not be necessary to achieve the benefits of reducing the NAS signaling burden on the system 100. For example, if a partial or pseudo-unique identifier successfully eliminates 90% of the UEs 102 camped on the CSG cell 104 initiating unnecessary NAS signaling procedures while still allowing some UEs 102 camped on the CSG cell 104 to unnecessarily initiate NAS signaling procedures (unnecessary, because these UEs 102 have not had their ACL 108-a changed), this reduction in signaling load will still be a desirable improvement. The second indication may be generated as a hash of the identity of the UE 102. The second indication may be generated as the M least significant bits of the identity of the UE 102, for example the 8 least significant bits of a 32 bit identity or a 64 bit identity of the UE 102. In some contexts, the second indication may be referred to as the UE_IDENTITY.

In an embodiment, including a UE_IDENTITY in the BCCH may be sufficient to alert one or more UEs 102 to initiate NAS signaling procedures or OMA DM signaling procedures. For example, in an embodiment, the BCCH does not include the CSG_SUBS_UPDATE parameter, the value tag carried in the MIB indicates a change of system information, the UE 102 reads the UE_IDENTITY and determines that it is designated by the UE_IDENTITY, and the UE 102 initiates an update of the ACL 108-a, for example by initiating the NAS signaling procedure or the OMA DM signaling procedure.

In an embodiment, the UE_IDENTITY may identify a plurality of UEs 102. For example, the UE_IDENTITY may comprise a list of identifiers associated with different UEs 102, each of which is the subject of a changed restricted access to the CSG cell 104. In another example, the UE_IDENTITY may comprise one or several identifiers which identify groups of UEs, which may be a subgroup of all the identities that could be used within the CSG group. In another embodiment, the limited BCCH resource may be deemed unsuited for carrying an extensive list of identifiers of UEs 102. In such a case, the identity of UEs 102 may be signaled using multimedia broadcast/multicast service (MBMS) functionality. For example, a special value or code may be transmitted in the UE_IDENTITY that indicates that the MBMS will be used to convey the changes or updates of ACL 108 to indentified UEs 102.

Figure 2:
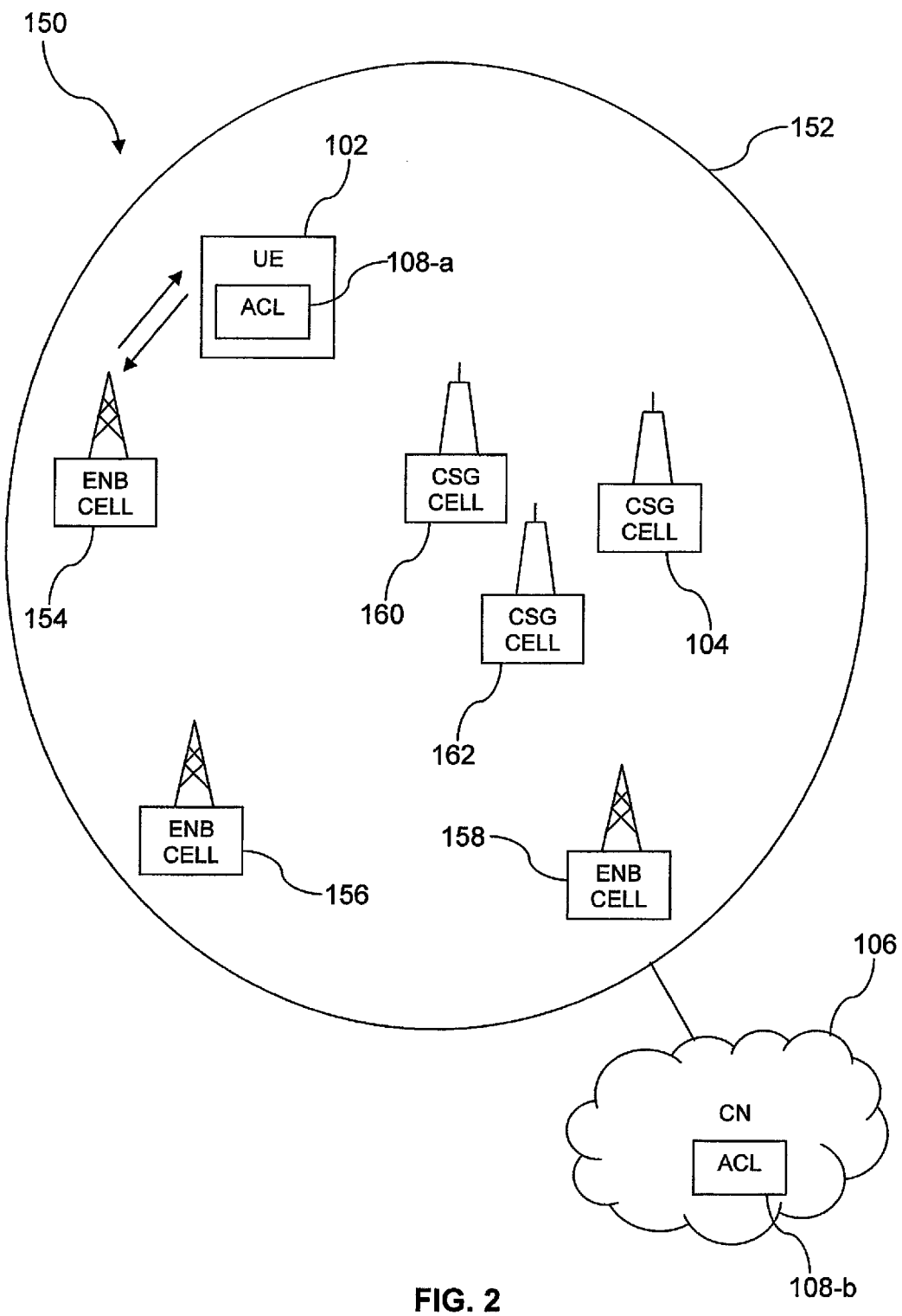
FIG. 2 is a block diagram of a mobile communication system according to some embodiments of the present disclosure.

Turning now to FIG. 2, a communication network 150 is described. The network 150 comprises a tracking area 152 comprising the UE 102, the CSG cell 104, a plurality of eNB cells 154, 156, 158 and a plurality of CSG cells 160, 162. The UE 102 is located within the coverage provided by the CSG cells and eNB cells that comprise the TA 152. Each of the eNB cells 154, 156, 158 and the CSG cells 160, 162 may be communicatively coupled to the CN 106 in a manner substantially similar to that described above for the communicative coupling between the CSG cell 104 and the CN 106. In some embodiments, the UE 102 may not initiate registration procedures with the CN 106, for example using a NAS signaling procedure, when the UE 102 moves between the coverage of cells belonging to the same tracking area (TA). For example, when the UE 102, while in RCC_IDLE mode, deselects the CSG cell 104 and selects the eNB cell 154, the UE 102 may not initiate a registration procedure for quite some time, for instance as long as the Tracking Area Identity (TAI) of the CSG cell 104 and eNB cell 154 are the same or that their respective TAIs are in the TAI list known to the UE 102. A TAI list is a list of TAIs that identify the tracking areas that the UE 102 may enter without performing a tracking area updating procedure. The TAIs in a TAI list may be assigned to the UE 102 by a mobility management entity (MME) and pertain to the same MME area. To page the UE 102, each of the cells of the TA may page the UE 102 when a terminating call arrives at the CN 106 for the UE 102. In some contexts, the eNB cells 154, 156, 158 may be referred to as access nodes (ANs).

Because the UE 102, while in RCC_IDLE mode, may select to any of the cells in the tracking area 152, a change to the ACL 108-*b*, as described above, may be signaled in the BCCH by each of the cells in the tracking area 152, for example by each of the eNB cells 154, 156, 158 and by each of the CSG cells 104, 160, 162. Substantially the same methods as described above may be employed. The CSG_SUB-S_UPDATE parameter may convey to all UEs 102 in the tracking area 152 that a subscriber of one of the CSG cells 104, 160, 162 has had a change of access and needs to synchronize the ACL 108-*a* stored by the subject UE 102 with the ACL 108-*b* stored in the CN 106. The UE 102 may trigger synchronization of the ACL 108-*a* with the ACL 108-*b* in the CN 106 by initiating a NAS signaling procedure, for example a tracking area update procedure and/or a service request procedure. Alternatively, the UE 102 may initiate a routing area update procedure, a location update procedure, and/or a service request procedure. Alternatively, the UE 102 may initiate an OMA DM procedure, and the UE 102 may be updated by an OMA-DM server (not shown).

To overcome the burden of all UEs 102 within the tracking area 152 initiating NAS signaling procedures and/or initiating OMA DM procedures, the UEs 102 may determine a time delay or time offset to stagger their initiation of NAS signaling and/or their initiation of OMA DM procedures to update the ACL 108-*b*. Alternatively, to avoid the burden of numerous NAS signaling procedures and/or OMA DM procedures to update one or a few ACL 108-*a*, each of the cells may transmit the second indication, for example the UE_IDENTITY parameter, on the BCCH to selectively designate specific UEs 102 to initiate the NAS signaling procedures and/or to initiate the OMA DM procedures. As above, the designation of specific UEs 102 may be conveyed using the MBMS services. In an embodiment, the CSG_SUBS_UPDATE parameter is not provided in the BCCH and the UE_IDENTITY parameter is provided, as described above, to indicate to the UE 102 to initiate a NAS signaling procedure and/or OMA DM procedure.

Alternatively, or in addition to, each of the cells may transmit a third indication on the BCCH that provides the CSG identity associated with the change of the ACL 108. For example the third indication may be transmitted in the MIB, in the SIB1, or in a system information block (SIB) of the BCCH. The third indication may comprise a complete identification of the subject CSG or a partial identification or a hashed version of the identification of the subject CSG. The third indication may be referred to as a CSG_IDENTITY parameter. In an embodiment, the third indication may be transmitted without the CSG_SUBS_UPDATE parameter on the BCCH and in combination with the UE_IDENTITY parameter may indicate to the UE(s) 102 to initiate a NAS signaling procedure and/or OMA DM procedure. In an embodiment, the third indication may be transmitted without the CSG_SUBS_UPDATE parameter on the BCCH and without the UE_IDENTITY parameter on the BCCH, indicating one or more UE(s) 102 to initiate a NAS signaling procedure and/or OMA DM procedure. In an embodiment, the CSG_IDENTITY parameter may comprise a partial identification of one or more CSGs. For example, the partial identification may comprise the four least significant bits of an identity or the eight least significant bits of an identity, or the partial identification may comprise a hash of an identity.

In another embodiment, the CN 106 may page the UE 102 when the ACL 108-*a* is out of synchronization with the ACL 108-*b*. For example, when the ACL 108-*b* is updated, the CN 106 subsequently initiates a page out to the UE 102, wherein the page may comprise an indication to initiate a NAS signaling procedure to update the ACL 108-*a*. In another embodiment, when the UE 102 enters RCC CONNECTED mode and the ACL 108-*b* has changed, the CN 106 pushes the ACL 108-*b* to the UE 102 or otherwise transmits to the UE 102 the change or changes of the list of CSG group to which the UE 102 has restricted access.

In any of the described solutions where a broadcast indication is used to indicate to one or more UEs 102 that their ACL 108 has changed for one or more CSGs, there exists a tradeoff between the amount of BCCH bandwidth used to identify that/those UE(s) 102 and the number of UEs 102 that may (unnecessarily) initiate procedures described herein to determine whether their ACL 108 is or is not still valid: the more bits used on the BCCH, the better the identification and the fewer unnecessary procedures carried out. For example, the identification by a few least significant bits of a mobile's identity may cause multiple mobiles whose identity shares those least significant bits to initiate the procedures unnecessarily. On the other hand, the identification of a single UE requires a high number of bits, but would result in only that UE 102 checking its ACL.

The example approach described here makes use of the fact that subscriptions to CSG cells may well be time-limited (e.g. in a coffee shop scenario, customers may be allowed one hour's access), and therefore that the ACLs 108 of multiple UEs 102 who were granted access at a similar time will change (i.e. have the access revoked) at a similar time (i.e. one hour later in the example).

In this approach, both the UE 102 and the CN 106 would store the time at which the UE 102 was made aware that it is allowed access to a CSG (in other words, the time when the CSG ID is added to the UE's 102 ACL 108, which may also be referred to as the UE's whitelist, by means of a NAS procedure involving both the EPC and the UE 102 such as the registration process. When the network wants to update the ACL 108-*a* for the UE 102, it determines the time that has elapsed since the UE 102 added the CSG ID to its ACL 108-*a* and indicates this (or a range of times e.g. 20-25 minutes) in downlink signaling (e.g. on the BCCH). A UE 102 which did not add the CSG ID to its ACL 108-*a* within the time period indicated need not respond to the signaling; a UE 102 which did add the CSG ID to its ACL 108-*a* in this time period (in this example, 20-25 minutes ago) would respond to the signaling to determine whether its ALU 108-*a* should be modified.

This has a benefit especially in scenarios where temporary time-based subscriptions are used, e.g., to allow access for 1, 4 or 24 hours, but where some UAs 102 have permanent subscriptions (that were added weeks or months ago). The signaling to trigger a temporary subscriber to update its ACL 108-*a* (to remove a subscription that has expired) may affect a few other temporary subscribers who happened to subscribe at the same time, but will not trigger a permanent subscriber (where the UE's ACL 108-*a* was updated days, weeks or months ago) to enquire about the validity of its ACL 108-*a*. (Note that other users who subscribed at the same time and for the same time period will respond and will then have their ACL 108-*a* updated to reflect their expired subscription).

This approach would further have the benefit that if the ACL 108-*a* of multiple UEs 102 is to be updated at the same time, then only one indication is required to identify all such UEs 102 whose ACL 108-*a* was updated to add the CSG ID at the same time. In the scenario above, where access is granted for specific units of time, then, for a set of UEs 102 whose ACL 108-*a* is to be modified to have access to a CSG ID removed at a given time, it could be expected that many of those UEs 102 were first granted access to that CSG ID UEs at (approximately) the same time.

Figure 3:
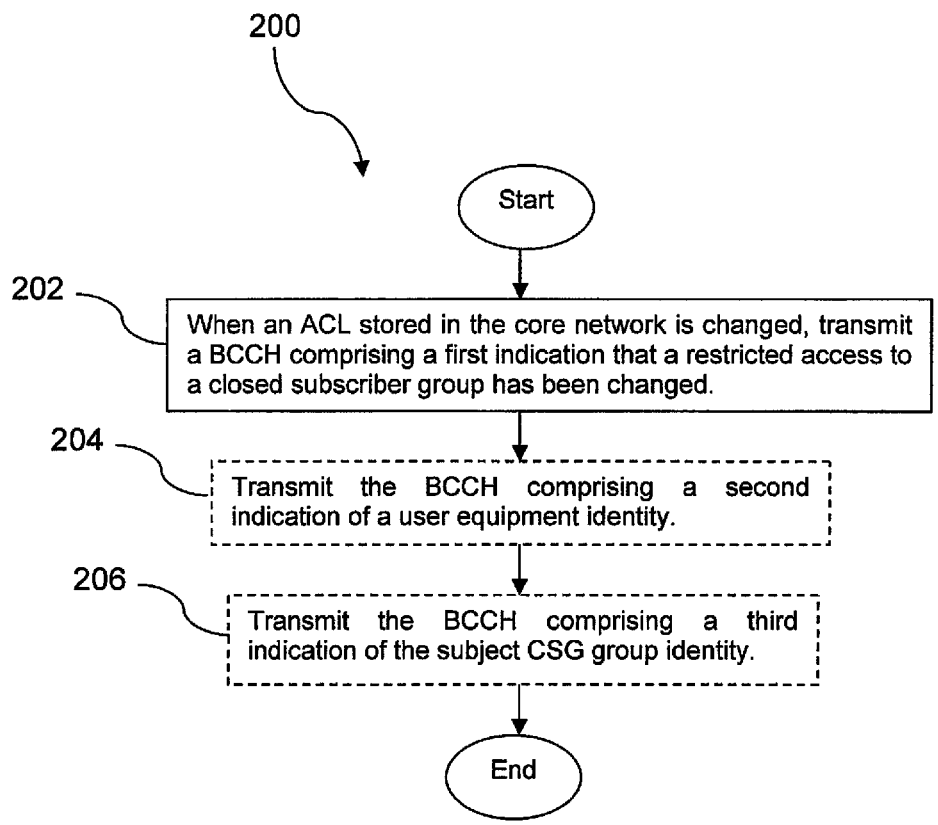
FIG. 3 is a flow chart of a method of synchronizing an allowed closed subscriber group list according to an embodiment of the disclosure.

Turning now to FIG. 3, a method 200 is described. At block 202, when the ACL 108-*b* is changed, for example the ACL 108-*b* stored by the CN 106, transmit a BCCH comprising a first indication that a restricted access to a closed subscriber group has been changed. In some contexts, the CN 106 or portions of CN 106 may be referred to as a packet data network. The first indication may comprise the CSG_SUBS_UPDATE parameter described above. The first indication may be carried by the MIB, the SIB1, or another system information block. At block 204, optionally transmit a BCCH comprising a second indication that further identifies the UE 102 that is the subject of the ACL change. As described above, the second indication may be transmitted as part of the MIB, part of the SIB1, or part of other system information blocks. At block 206, optionally transmit a BCCH comprising a third indication that further identifies the subject CSG group identity, for example the identity of the CSG group that has been removed or added to the ACL 108-*b*. As described above, the third indication may be transmitted as part of the MIB, part of the SIB1, or part of other system information blocks. In an embodiment, either a CSG cell 104, 160, 162 and/or an eNB cell 154, 156, 158 may perform the method 200. As described above, in different embodiments, different parameters may be encapsulated in the BCCH to trigger the UE 102 to synchronize the ACL 108-*a* with the ACL 108-*b*, for example by initiating a NAS signaling procedure and/or by initiating an OMA DM procedure. For example, the second indication, which may be referred to as the UE_IDENTITY, may be transmitted on the BCCH without the first indication, for example without the CSG_SUBS_UPDATE parameter. The second indication may be transmitted on the BCCH either with the third indication or without the third indication. For example, the third indication, which may be referred to as the CSG_IDENTITY, may be transmitted on the BCCH without the first indication, for example without the CSG_SUBS_UPDATE parameter. The third indication may be transmitted on the BCCH either with the second indication or without the second indication.

Figure 4:
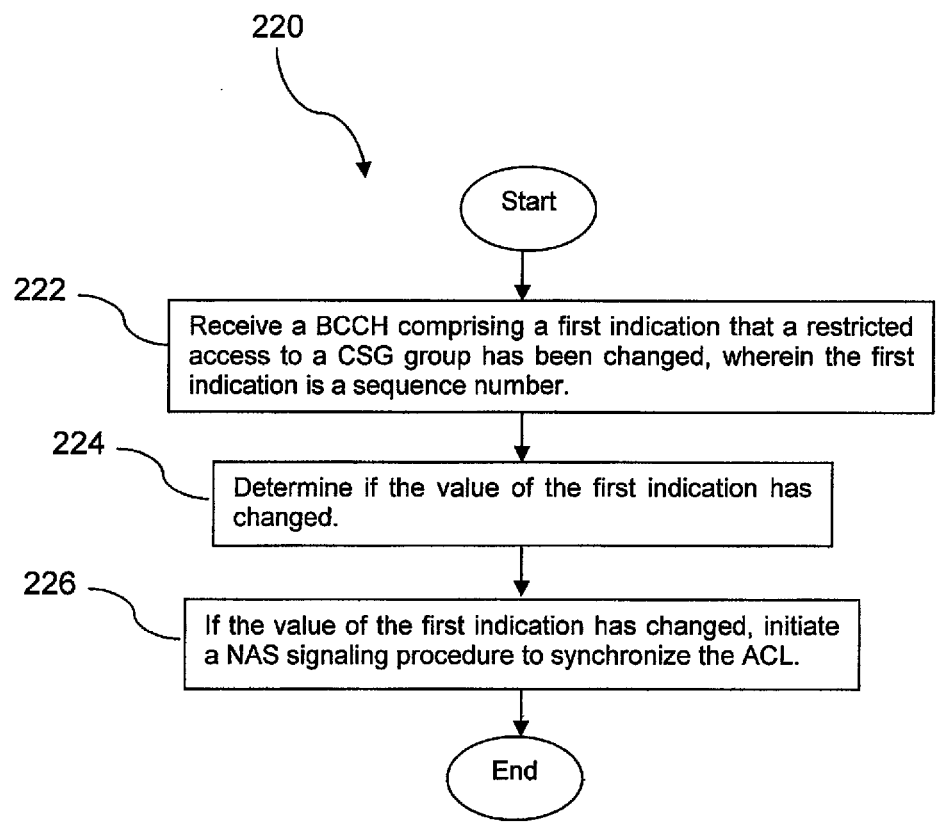
FIG. 4 is a flow chart of another method of synchronizing an allowed closed subscriber group list according to an embodiment of the disclosure.

Turning now to FIG. 4, a method 220 is described. In an embodiment, the UE 102 may perform the method 220 to synchronize the ACL 108-*a* stored by the UE 102 with the ACL 108-*b* stored by the CN 106. At block 222, a BCCH is received comprising a first indication that a restricted access to a CSG group has been changed. In an embodiment, the first indication may be a sequence number, as described further above. In an embodiment, the first indication may be conveyed in the MIB, the SIB1, or another system information block of the BCCH. At block 224, the value of the first indication is analyzed to determine if the value has changed. For example, the UE 102 may store the value of the first indication when it last changed, or when the UE 102 last camped on the CSG cell 104, and compare the received value of the first indication received in the BCCH. If the value of the first indication is unchanged, the UE 102 may not perform any further processing of the BCCH related to the ACL 108-*a*. At block 226, if the value of the first indication has changed, the UE 102 initiates a non access stratum (NAS) signaling procedure or an OMA DM signaling procedure to synchronize the ACL 108-*a* stored by the UE 102 with the ACL 108-*b* stored by the CN 106. In an embodiment, the UE 102 may further check if a second indication in the BCCH, as described above, designates the UE 102 and initiate the NAS signaling procedure if the UE 102 is designated by the second indication. In an embodiment, the UE 102 may further check if a third indication in the BCCH, as described above, designates a CSG identity contained in the ACL 108-*a* stored by the UE 102 and initiate the NAS signaling or OMA DM procedure if the designated CSG group is contained in the ACL 108-*a*.

Figure 5:
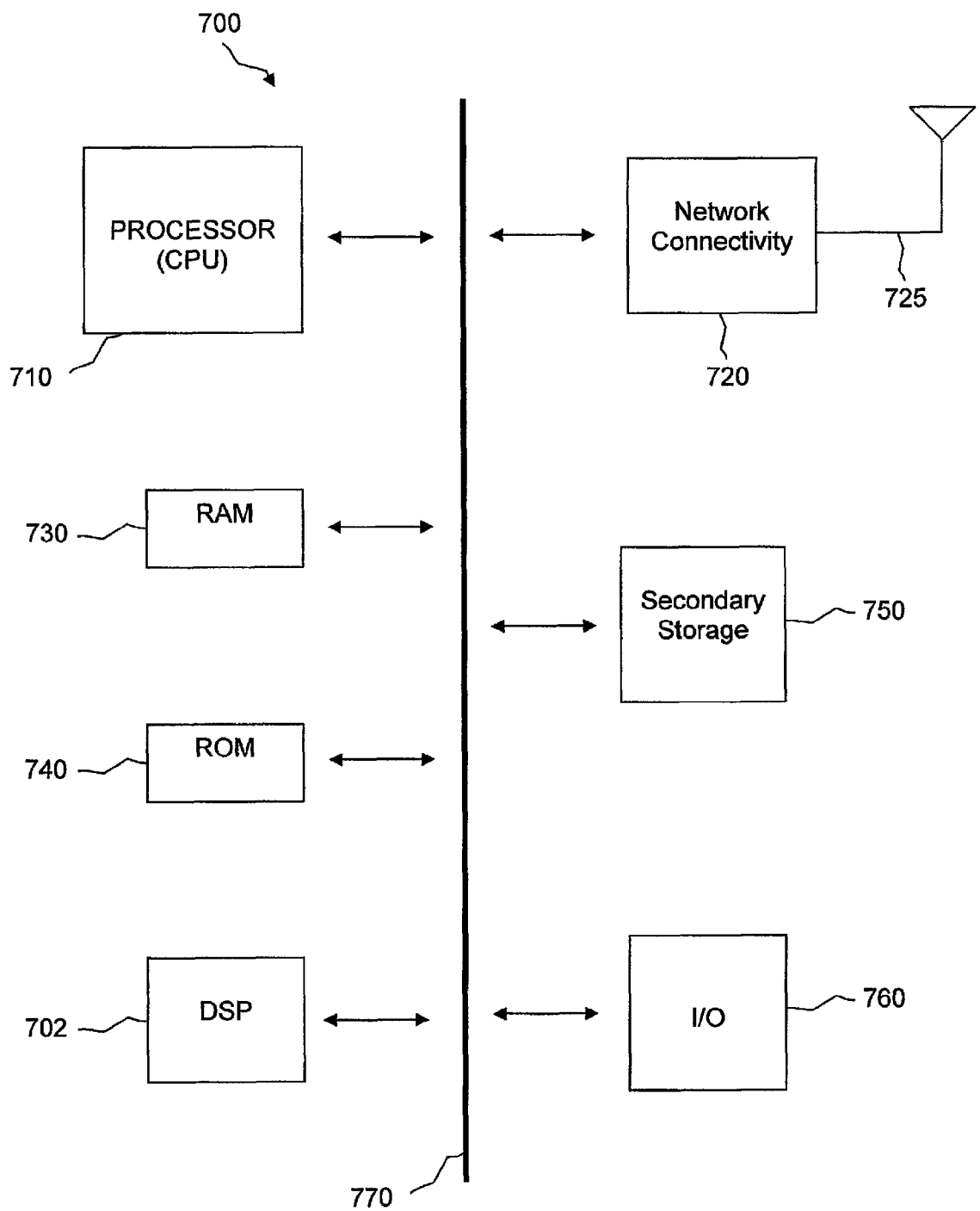
FIG. 5 illustrates a processor and related components suitable for implementing some embodiments of the present disclosure.

The CSG cells, eNBs, UEs, and other components described above might include a processing component that is capable of executing instructions related to the actions described above. FIG. 5 illustrates an example of a system 700 that includes a processing component 710 suitable for implementing one or more embodiments disclosed herein. In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 770. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 702. Although the DSP 702 is shown as a separate component, the DSP 702 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 725 might be considered to be a component of the I/O devices 760 instead of or in addition to being a component of the network connectivity devices 720.

The following are incorporated herein by reference for all purposes: 3rd Generation Partnership Project (3GPP) Technical Specification (TS) 24.008, 24.301, 25.304, 25.331, 36.304, and 36.331.

In an embodiment, a user equipment (UE) is disclosed. The UE comprises a processor configured to receive a broadcast control channel (BCCH) comprising a first indication that a restricted access to a closed subscriber group has been changed and to initiate a signaling procedure based on the first indication.

In another embodiment, an access node (AN) is disclosed. The AN comprises a processor configured to transmit a broadcast control channel (BCCH) comprising a first indication that a restricted access to a closed subscriber group has been changed.

In another embodiment, a method of synchronizing an allowed closed subscriber group list (ACL) is disclosed. The method comprises, when an ACL stored in a core network is changed, transmitting a broadcast control channel (BCCH) comprising a first indication that a restricted access to a closed subscriber group has been changed.

In another embodiment, a method of synchronizing an allowed closed subscriber group list (ACL) is disclosed. The method comprises receiving a broadcast control channel (BCCH) comprising a first indication that a restricted access to a closed subscriber group has been changed, wherein the first indication is a sequence number, determining that the value of the first indication has increased, and a user equipment (UE) initiating a non access stratum signaling procedure based in part on determining that the value of the first indication has increased, wherein the non access stratum signaling procedure synchronizes the ACL.

In another embodiment, a method of synchronizing an allowed closed subscriber group list (ACL) is disclosed. The method comprises, when an ACL stored in a packet data network is changed to remove a closed subscriber group identity, paging a user equipment (UE) associated with the ACL to initiate a non access stratum signaling procedure, wherein the non access stratum signaling procedure synchronizes a copy of the ACL stored in the UE with the ACL stored in the packet data network.

In another embodiment, a method of synchronizing an allowed closed subscriber group list (ACL) is disclosed. The method comprises, when an ACL stored in a packet data network (PDN) is updated, the packet data network transmitting an update of the ACL to the user equipment (UE) associated with the ACL.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
 a processor configured to:
  receive, at a user equipment (UE), a first indication broadcast on a broadcast control channel (BCCH) from a cell currently serving the UE, the first indication indicating that a restricted access to a closed subscriber group has been changed, wherein the first indication comprises a sequence number;
  determine that the sequence number in the first indication has changed from a sequence number in a previously received indication broadcast from the cell; and
  initiate a non access stratum (NAS) signaling procedure with the cell based on determining that the sequence number in the first indication has changed, wherein the NAS signaling procedure synchronizes an access control list (ACL).

2. The user equipment of claim 1, wherein the NAS signaling procedure is at least one of a tracking area update procedure, a service request procedure, and an attach procedure.

3. The user equipment of claim 1, wherein the first indication is received in one of a master information block (MIB), a first system information block (SIB1), and another system information block of the BCCH.

4. The user equipment of claim 1, wherein the processor is further configured to:
 receive, at the UE, a second indication broadcast on the BCCH, wherein the second indication indicates an at least partial identity of the user equipment; and
 wherein initiating the NAS signaling procedure is further based on the second indication.

5. The user equipment of claim 1, wherein the processor is further configured to:
 receive, at the UE, a third indication broadcast on the BCCH, wherein the third indication indicates an identity of the closed subscriber group that is the subject of the changed restricted access; and
 wherein initiating the NAS signaling procedure is further based on the third indication.

6. An access node (AN), comprising:
 a processor configured to:
  broadcast, on a broadcast control channel (BCCH), a first indication indicating a restricted access to a closed subscriber group has been changed;
  broadcast, on the BCCH, a second indication identifying a user equipment (UE) associated with the restricted access change; and
  in response to broadcasting the first indication and the second indication, receiving a synchronization request from the UE to initiate synchronization of the restricted access between the UE and the core network.

7. The access node of claim 6, wherein the first indication is provided in one of a master information block (MIB), a first system information block (SIB1), and another system information block of the BCCH.

8. The access node of claim 6, wherein the first indication comprises a sequence number.

9. The access node of claim 6, wherein the processor is further configured to:
broadcasting a third indication, on the BCCH, the third indication indicating an identity of the closed subscriber group that is the subject of the changed restricted access.

10. The access node of claim 6, wherein the first indication comprises one of an indication of an identity of a user equipment and an indication of an identity of a close subscriber group.

11. The access node of claim 6, wherein the access node is a closed subscriber group (CSG) cell.

12. The access node of claim 11, wherein the access node belongs to the closed subscriber group to which restricted access has been changed.

13. The access node of claim 11, wherein the access node does not belong to the closed subscriber group to which restricted access has been changed.

14. A method of synchronizing an allowed closed subscriber group list (ACL), comprising:
when an ACL stored in a core network is changed:
broadcasting, on a broadcast control channel (BCCH), a first indication indicating that a restricted access to a closed subscriber group has been changed;
broadcasting, on the BCCH, a second indication identifying a user equipment (UE) associated with the ACL change; and
in response to broadcasting the first indication and the second indication, receiving a synchronization request from the UE to trigger synchronization of the ACL between the UE and the core network.

15. The method of claim 14, wherein the first indication comprises a sequence number.

16. The method of claim 14, wherein the second indication is based on at least one of an international mobile subscriber identity (IMSI) of the UE and a temporary mobile station identity (TMSI) of the UE.

17. The method of claim 16, wherein the second indication is a hash of at least one of the international mobile subscriber identity (IMSI) of the UE and the temporary mobile station identity (TMSI) of the UE.

18. The method of claim 14, further comprising:
broadcasting a third indication on the BCCH, the third indication indicating an identity of the closed subscriber group that is the subject of the changed restricted access.

19. A method of synchronizing an allowed closed subscriber group list (ACL), comprising:
receiving, at a user equipment (UE), a first indication broadcast on a broadcast control channel (BCCH) from a cell currently serving the UE, the first indication indicating that a restricted access to a closed subscriber group has been changed, wherein the first indication comprises a sequence number;
determining that the sequence number in the first indication has changed from a sequence number in a previously received indication broadcast from the cell; and
initiating, by the UE, a non access stratum signaling procedure with the cell based on determining that the sequence number in the first indication has changed, wherein the non access stratum signaling procedure synchronizes the ACL.

20. The method of claim 19, further comprising:
receiving, at the UE, a second indication broadcast on the BCCH, wherein the second indication indicates a closed subscriber group identity;
determining that the closed subscriber group identity is contained in the ACL stored by the UE; and
wherein initiating, by the UE, the NAS signaling procedure is further based on determining that the closed subscriber group identity is contained in the ACL stored by the UE.

21. A method of synchronizing an allowed closed subscriber group list (ACL), comprising:
when an ACL stored in a packet data network is changed to remove a closed subscriber group identity, paging a user equipment (UE) associated with the ACL to initiate a non access stratum signaling procedure in response to the ACL change,
wherein the non access stratum signaling procedure synchronizes a copy of the ACL stored in the UE with the ACL stored in the packet data network.

22. The method of claim 14, wherein the first indication is provided in one of a master information block (MIB), a first system information block (SIB1), and another system information block of the BCCH.

23. The method of claim 14, wherein the first indication comprises one of an indication of an identity of a user equipment and an indication of an identity of a close subscriber group.

24. The method of claim 14, wherein the access node is a closed subscriber group (CSG) cell.

25. The method of claim 24, wherein the access node belongs to the closed subscriber group to which restricted access has been changed.

26. The method of claim 14, wherein the access node does not belong to the closed subscriber group to which restricted access has been changed.

27. The method of claim 19, wherein the NAS signaling procedure is at least one of a tracking area update procedure, a service request procedure, and an attach procedure.

28. The method of claim 19, wherein the first indication is received in one of a master information block (MIB), a first system information block (SIB1), and another system information block of the BCCH.

29. The method of claim 19, further comprising:
receiving, at the user equipment (UE), a second indication broadcast on the BCCH, wherein the second indication indicates an at least partial identity of the user equipment; and
wherein initiating the NAS signaling procedure is further based on the second indication.

* * * * *